US006678617B2

(12) United States Patent
Khan

(10) Patent No.: US 6,678,617 B2
(45) Date of Patent: *Jan. 13, 2004

(54) MAPPING SUBSURFACE OPEN FRACTURES USING ELASTICALLY NONLINEAR INTERACTION OF TWO SURFACE-GENERATED WAVES

(75) Inventor: Tawassul Ali Khan, Cypress, TX (US)

(73) Assignee: Nonlinear Seismic Imaging, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/879,713

(22) Filed: Jun. 13, 2001

(65) Prior Publication Data

US 2003/0004649 A1 Jan. 2, 2003

(51) Int. Cl.[7] .................................................. G01V 1/00
(52) U.S. Cl. ........................................... 702/16; 367/41
(58) Field of Search ....................... 367/40, 41; 702/17, 702/16; 73/579

(56) References Cited

U.S. PATENT DOCUMENTS 4,128,011 A * 12/1978 Savage .......................... 73/579
5,986,974 A * 11/1999 Luo et al. ....................... 367/41
6,181,646 B1 * 1/2001 Bouyoucos et al. ........ 367/189

* cited by examiner

*Primary Examiner*—John Barlow
*Assistant Examiner*—Toan M Le
(74) *Attorney, Agent, or Firm*—Nonlinear Seismic Imaging, Inc.

(57) ABSTRACT

This invention relates to mapping the open fractures in the reservoir subsurface formations. To map these open fractures, the elastically nonlinear interaction of the two surface generated seismic waves, as they propagate through the open fractures and are reflected back from the subsurface boundaries, is recorded using conventional 3-D seismic receiver configurations. Recorded data are processed for standard 3-D reflection imaging and additionally for mapping the location and orientation of the subsurface open fractures.

6 Claims, 5 Drawing Sheets

MAPPING SUBSURFACE OPEN FRACTURES USING ELASTICALLY NONLINEAR INTERACTION OF TWO SURFACE-GENERATED WAVES

BACKGROUND OF THE INVENTION

1. Field of Invention

The present invention relates to mapping the open natural fractures in the hydrocarbon reservoirs, using two surface-generated seismic signals by measuring their elastically nonlinear interaction caused due to their transmission through the open fractures.

2. Description of the Prior Art

In most of the carbonate and certain sandstone reservoirs, natural fractures are encountered that are open and control the directional permeability and the effective flow pathways for the hydrocarbons. Mapping these fractures and their orientation is the key to the economic recovery of hydrocarbons from these reservoirs. At present, natural fracture characterization is of increasing importance, since the industry is venturing into increasing their producible reserves from the existing fields that are showing production decline.

Natural fractures in the subsurface rocks are usually vertical and are mostly found in the formations that have gone through structural deformation or have experienced regional stresses. These fractures commonly terminate at lithologic discontinuities within the reservoir formations. These fractures can be closely or widely spaced and irregularly distributed. Quite often, swarms of fractures are encountered with unfractured intervals in between. Economic hydrocarbon production from the fractured reservoirs requires an optimal access of the wellbore to the open fractures. This makes it extremely important that an accurate map of the open fracture system should be available prior to any field infill and development program.

In many cases, fractures are difficult or impossible to map adequately by using currently available technologies. Physical measurements through cores and well logs are limited to the vicinity of the wells drilled in the reservoir. The density of sampling the reservoir rock using cores and well logs quite often is not sufficient to provide any useful information regarding the orientation and the location of the fractures. This is due to two main characteristics of the majority of the wells that are drilled:

1) Both the wells and the fractures are generally vertical and parallel to each other; and
2) The wellbore is smaller than the fracture spacing between the larger fractures.

Horizontal drilling—where the cost of drilling a well is high—has to be designed to take full advantage of the natural fractures that are open, by mapping their location and their orientation. Since a single horizontal well is limited in producing from a few layers of the reservoir, it is important to identify the part of the reservoir from which the production can be optimized, prior to drilling the well. This requires that the specific fractured beds should be identified prior to any drilling commitments.

This invention uses the elastically nonlinear interaction between two seismic waves as they propagate through the open fractures in the reservoir formation. Two compressional seismic signals are used. One is a higher frequency swept signal ('carrier' wave) transmitted from the surface, using a surface seismic vibratory source. This 'carrier' wave penetrates the reservoir and travels through the fractured rock and after being reflected from the formation directly below the fractures, is recorded by the receivers that are located on the surface. The second is a lower-frequency seismic signal ('modulation' wave) that is also transmitted from the surface using a similar source like a surface seismic vibrator. The nonlinear elastic interaction between the 'carrier' wave and the 'modulation' wave, as both the waves travel through the open fracture, is measured.

The nonlinear interaction between the two compressional waves, mentioned above, will be zero when the 'modulation' source and the 'carrier' source are located parallel to the fractures or directly above them. The interaction will also be zero when the sources and the receivers are located on the surface in such a manner that the recorded reflected signal does not intersect any subsurface open fractures.

By moving the surface sources to different locations on the surface and recording the reflected seismic signals from the subsurface formations by multiple receivers located on the surface, the measurements of the nonlinear interaction between the 'carrier' and 'modulation' waves can be used to determine the location and orientation of the fractures.

Since practically all the subsurface fractures are vertical, the fracture width of the open fractures is not modulated when the 'modulation' and the 'carrier' surface sources are directly above them. The 'modulation' is maximized when the 'modulation' source is at or near right angles to the fractures and at a distant offset, so that the 'modulation' seismic signal is arriving at the fracture at a wide angle.

In a three dimensional (3-D) seismic recording, the surface receivers are located over a large surface area, providing a good distribution of source/receiver offset distances. Multiple receiver layout configurations are used to provide an even distribution of source/receiver azimuthal angles for the reflection paths of the seismic signals. The art and knowledge to use different configurations of seismic sources and receivers for 3-D recording are well known in the seismic-imaging industry, and need not be described in detail in this invention. Once the main concept of this invention is understood, anyone familiar with 3-D seismic recording can use this invention to map the orientation and location of the open fractures by analyzing the data representing the nonlinear interaction between the two transmitted waves, recorded by receivers over large distribution of source/receiver azimuthal angles and offset distances.

SUMMARY OF THE INVENTION

Briefly, the present invention provides a new and accurate seismic method of mapping the orientation and location of the open natural fractures that are common in the hydrocarbon reservoirs. Two predetermined seismic signals are used. One is a higher frequency swept signal referred to in the description as a 'carrier' signal that is in a higher frequency range compared to the lower frequency signal, which is termed as a 'modulation' signal. The 'carrier' signal is transmitted using a vibratory surface seismic source located in a pattern designed for conventional 3-D seismic recording. The lower frequency source is also located on the surface and can be easily deployed in any geometric pattern that is considered necessary to map the location and orientation of the fractures. For this particular description both the seismic surface sources that generate the 'modulation' and the 'carrier' seismic signals are located at the same surface location. Since the lower frequencies are less attenuated as they travel through the earth, the level of the 'modulation' signal available at the subsurface fractures would be larger in amplitude compared to the higher frequency 'carrier' signal.

Experiments in rocks show a large nonlinear elastic wave response, far greater than that of gases, liquids, and most other solids, The large response is attributed to structural discontinuities in the rocks such as fractures (P. A. Johnson and K. R. McCall, Los Alamos National Laboratory, Los Alamos, N.Mex.). Two compressional waves, as they propagate through a fractured rock that acts as an elastically nonlinear medium, interact with each other. Due to this nonlinear interaction, the sum and difference frequencies of the two primary waves are created. These new frequencies constitute the 'interaction' wave that travels along with the primary waves. The amplitude of the summed frequencies or the 'interaction' wave is a function of the amplitudes of the two primary waves and the propagation distance through the nonlinear rock. The amplitude of the 'interaction' wave is proportional to the product of the primary wave amplitudes. Its amplitude grows with propagation distance due to nonlinearity, and decays with distance due to attenuation. Reference U.S. Pat. No. 6,175,536 (Khan), where the interaction of the two crosswell seismic signals was successfully recorded and displayed as they propagate through the nonlinear reservoir formations.

This invention uses the measurement of the summed and differenced frequencies that are created due to the interaction of the two seismic (waves) or signals as they propagate through the open fractures in the reservoir formation. One of the signals is a vibratory 'sweep' commonly used for seismic recording; the frequency is swept over the seismic band from low to high or high to low over a period of several seconds. The concept is well known in the industry and is the current art.

The second signal is a mono-frequency sinusoidal signal, which has the same time duration as the vibratory 'sweep'. Both the seismic signals or waves are generated, and transmitted using standard vibratory sources from a single source array, that behave as a single surface source location The combined seismic wave is used for seismic reflection recording. It propagates through the surface formations and is transmitted and reflected at the formation boundaries that provide acoustic impedance contrasts. The reflected seismic signals are recorded using multiple detector arrays, located on the surface or in different wellbores or both. The recording procedures are known in the current art.

In this invention, the interaction of the two compressional seismic waves as they propagate through the reservoir rocks is measured to map their nonlinear characteristics that are caused due to the open fractures in the rocks. The data, which are recorded, have two different sets of information. The cross-correlation with the standard 'sweep' provides the normal data-set that is used for normal reflection processing similar to current 2-D and 3-D seismic processing; it is universally practiced and known in the art. The second set of information is extracted by generating two new 'sweep' signals. These new signals are synthetically generated by adding and differencing the mono-frequency with the 'sweep' frequencies, thus providing two 'modified-sweeps' and cross-correlating the recorded data with these 'modified-sweeps.'

This new set of data, which results after cross-correlation with the two 'modified-sweeps' and contains newly generated frequencies, represents the result of interaction between the mono-frequency wave and the 'sweep' frequency wave, as they propagate through the nonlinear fractured reservoir rocks. The processing parameters for this new data-set are similar to the parameters used for the data generated after cross correlation with the primary 'sweep' signal. Conventional 2-D and 3-D seismic processing sequence can be used for both sets of data to provide the reflection seismic image of the subsurface. The integration and interpretation of the two results, one based on the primary 'sweep', and the other based on the two 'modified-sweeps', highlights and identifies the subsurface formations that are nonlinear due to open fractures. The results based on the two 'modified-sweeps' will display the reflected signals from the fractured formations at relatively higher amplitudes compared to the reflections from homogeneous and non-porous formations. The relative amplitudes of different reflections determine the relative measure of the bulk fractures in the subsurface formations.

The seismic results based on the second data-set that are produced after cross-correlation with the two 'modified-sweeps' identify and highlight the zones that have higher nonlinearity due to open fractures.

When there are open fractures in a reservoir formation, the amplitude of the reflected signal from the lower boundary of the fractured formation will be affected by the presence of fractures, their extent and their orientation. The amplitude of the data that results after the cross-correlation with the 'modified-sweeps' will vary with the source/receiver azimuth and will depend on the direction of travel of the seismic transmitted and reflected signal relative to the fractures location and orientation. Relatively larger amplitudes will signify that the seismic signal and the 'carrier' and 'modulation' waves are arriving at the fractures at a wide angle, and the direction of arrival is at right angles to the fractures.

3-D seismic data can be easily sorted according to the source/receiver azimuthal angles and offset distances; this is done routinely as a part of data processing, and is well known in the industry. The sorted data provides 360 degrees azimuth control and offset distance distribution that can vary from near zero distance to several thousand feet. This wide range of offset distances and azimuthal angles can be used for fracture detection, using the cross-correlated results of the 'modified-sweeps.'

3-D seismic data volume that results after cross-correlation with the 'modified-sweep' can be sorted according to the source/receiver azimuthal angles and the 2-D seismic data (slices) that result are processed for 2-D reflection imaging. The quality and the amplitude of the reflected signals, which correspond to the fractured formation, are analyzed on all the 2-D slices. The 2-D reflected image of the fractured formation that shows the highest coherency and amplitude indicates that the particular azimuthal angle is perpendicular to the fracture orientation and the lowest amplitude represents the azimuthal angle parallel to the fracture orientation. The common mid-point of the highest amplitude reflected signal will identify the location of the fractures.

DESCRIPTION OF THE PREFERRED EMBODIMENT

Figure 1:
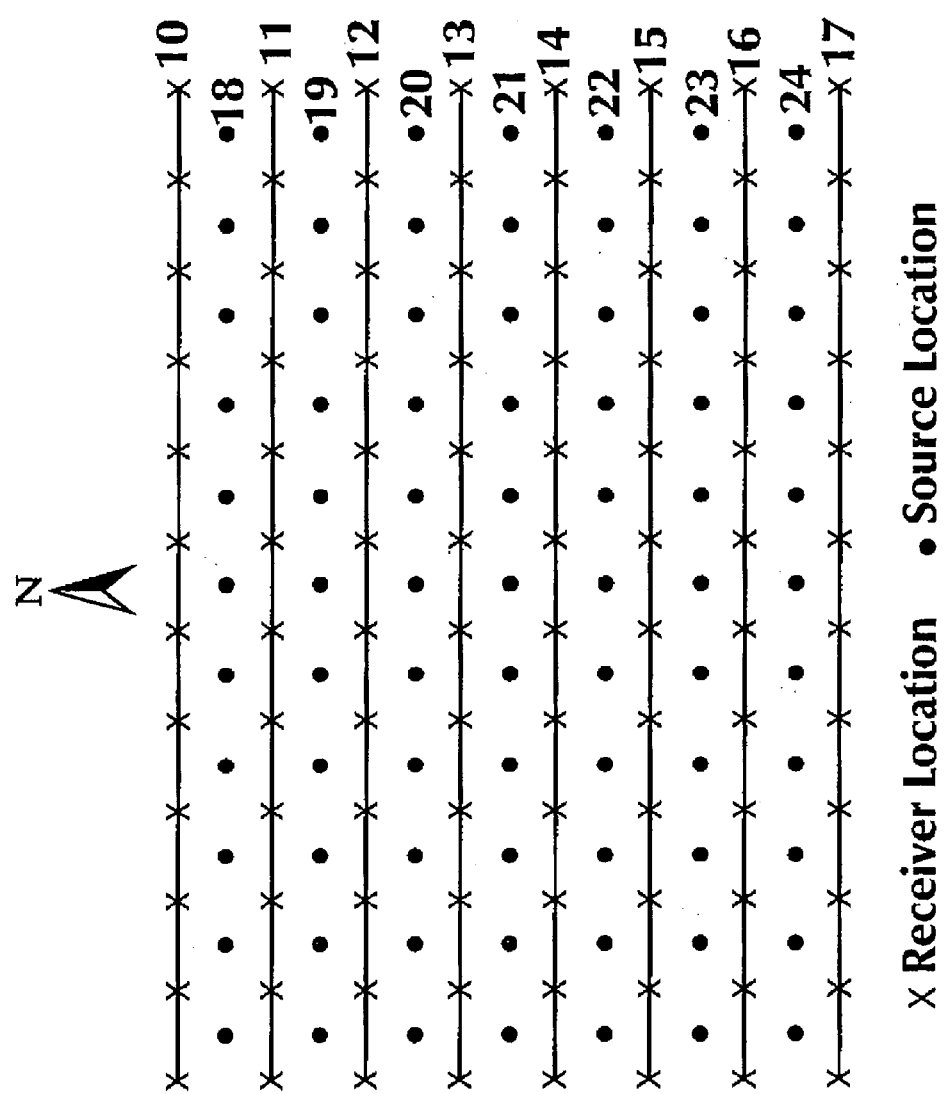
FIG. 1 is a schematic that shows a 3-D surface seismic layout where the multiplicity of source and receiver locations are such that they provide a good distribution of source/receiver azimuthal angles and offset distances.

FIG. 1 shows a simple surface 3-D seismic layout of the source and receiver locations that provides an even distribution of the source/receiver azimuthal angles and offset distances. Such seismic layouts are commonly practiced in the industry and are known in the art. 3-D seismic data is sorted according to offset distances and the azimuthal angles. Seismic data sorted according to the offset distances is at times processed for measuring amplitude differences with offset, commonly known in the industry as AVO (Amplitude versus Offset). AVO studies are made for detecting hydrocarbons due to gas/liquid presence in a reservoir. At times seismic data is sorted according to the azimuthal angles of the source/receiver geometry, and processed for amplitude variation related to the azimuthal angles. Based on amplitude variations the seismic anisotropy is determined, sometimes called AVA. Using AVA, the presence of the open fractures and their orientation can be measured as a part of seismic anisotropy. However, due to the geometric effects of the subsurface reservoir formations, quite often there is ambiguity in the AVA and AVO results, and the results are not reliable.

This invention uses the elastic nonlinear property of the subsurface open fractures to the seismic waves, and measures the elastically nonlinear interaction of the seismic waves that propagate through them to determine the location and orientation of the open fractures. This new approach provides more reliable results and reduces ambiguity since the results are definitive.

FIG. 1 shows receiver lines 10, 11, to 17, the receiver locations are marked as 'crosses', and the source lines as 18, 19, to 24, marked as 'dots', such source/receiver layouts are common in the industry, especially in the cases where AVO or AVA processing is performed. FIG. 1 is included in the description of the Patent to emphasize that the know-how of seismic data acquisition to acquire a seismic data set that will provide an even distribution of offset distances and azimuthal angles exists and can be readily used to implement this invention in the field.

Figure 2:
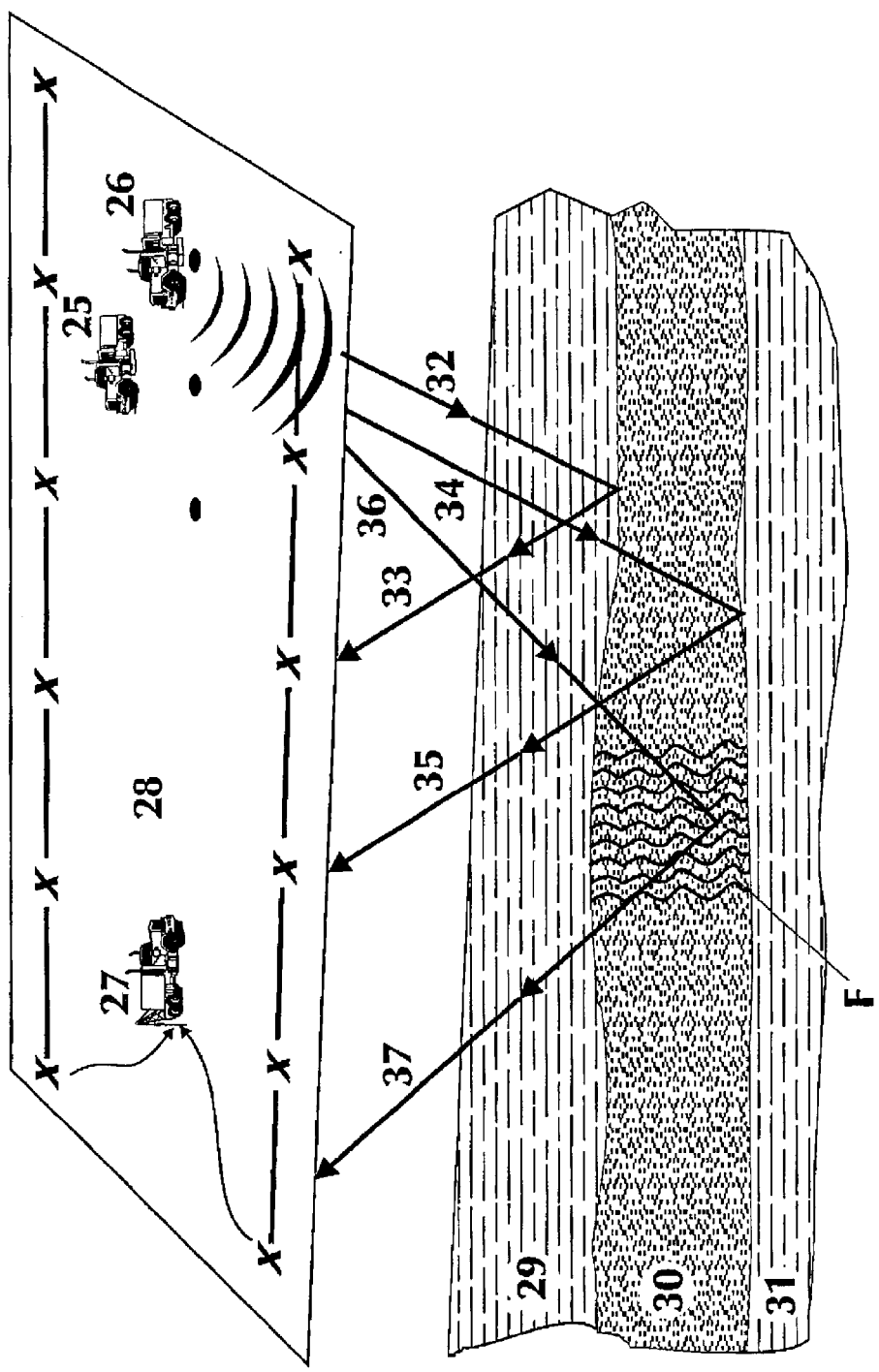
FIG. 2 is a simplified illustration of surface seismic recording and displays the seismic reflected signal that propagates through a swarm of fractures.

FIG. 2 is a simplified drawing partly in cross-section of a field layout. A surface vibratory source 25 transmits a seismic frequency swept signal, in this case 15 to 100 Hz. Another surface vibratory source 26, located at the same surface station, transmits a mono-frequency signal of 10 Hz. Both signals are simultaneously transmitted and propagate through the subsurface formations, 29, 30, and 31. Formations 29 and 31 are homogeneous and unfractured, while formation 30 has a swarm of open fractures F as shown. Seismic sources transmit the seismic signals that propagate through the subsurface formations, 29, 30, and 31. These compressional seismic signals are transmitted and reflected at the formation boundaries that provide acoustic impedance contrasts. The reflected signals are received by the receiver arrays 28, shown as crosses, and recorded by a field recording system 27. This recording process is common in the industry and is used worldwide and needs no description.

FIG. 2 shows sources 25 and 26 transmitting seismic signals from the same surface location. The seismic signal 32 is reflected from the upper interface of formation 30 and recorded by the receivers as 33. The seismic signal 34 is reflected from the lower interface of the formation 30 and recorded as 35. The seismic signal 36 propagates through the swarm of open fractures F, reflected from the lower boundary of the formation 30 and recorded as 37. Recorded signals 33 and 35 represent the signals that do not intersect any open fractures during their propagation from the origin to their destination on the surface where they are received by 28 and recorded by 27. Since their two-way path has been through homogeneous and unfractured rocks, and their entire propagation has been through elastically linear medium, the theory of superposition holds and there is no interaction between the seismic signals transmitted from and 26. However the recorded signal 37 travels through the part of the formation 30 that is fractured F. The open fractures produce discontinuity in the rock matrix, making the properties elastically nonlinear. Due to this elastic nonlinearity the theory of superposition does not hold, and there is nonlinear interaction between the two signals transmitted from sources 25 and 26. The swept frequency signal, 15 Hz to 100 Hz ('carrier') nonlinearly interacts with 10 Hz ('modulation') signal; frequency mixing takes place, and sum and difference frequencies are formed. The measurement of these newly generated frequencies identifies the presence of open fractures.

Figure 3:
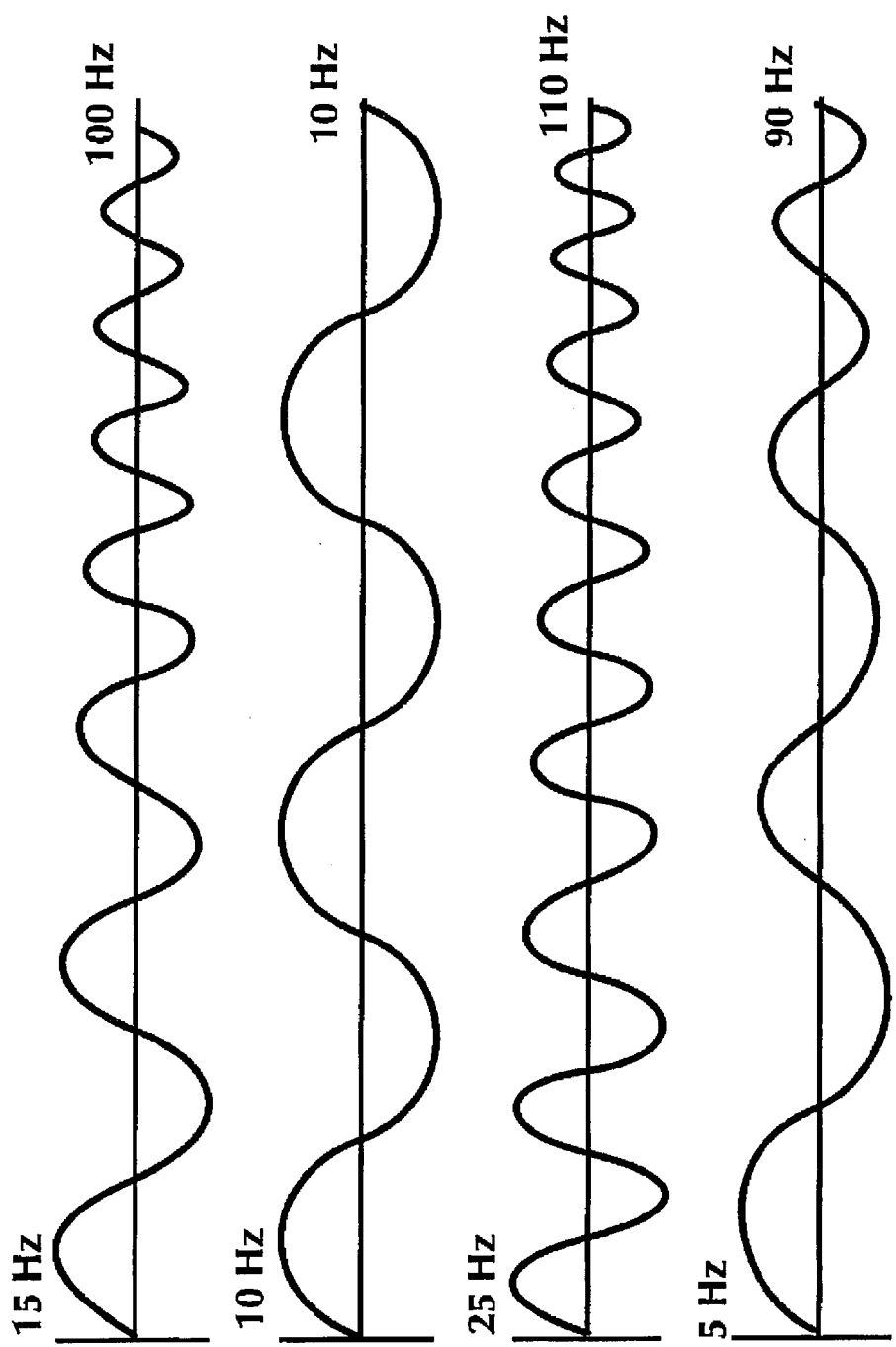
FIG. 3 shows the results of nonlinear elastic interaction between two seismic signals.

FIG. 3 shows the swept signal 38 ('carrier') is transmitted from the source 25, a linearly swept signal starting at 15 Hz and increasing to 100 Hz over a 10-second period. The signal 39 ('modulation') is a mono-frequency signal of 10 Hz, transmitted from the source 26; it stays unchanged over the transmission period of 10 seconds. Both signals 38 and 39 are synchronized to start and end at the same times. The signals 38 and 39 are transmitted from the same source location and travel simultaneously through the same reservoir rocks. During their propagation if they experience a part of their transmission through fractured rock (which is elastically nonlinear), then they nonlinearly interact with each other and sum and difference frequencies are generated. When the swept signal 38 nonlinearly interacts with mono-frequency signal 39, then two new swept frequency signals are formed. The new swept frequency signals that are generated due to the nonlinear interaction between the 15 to 100 Hz sweep and the 10 Hz mono-frequency signal are: (1) a 25 Hz to 110 Hz sweep shown as 40 that results from the summation of two frequencies in time; and (2) a 5 Hz to 90 Hz sweep shown as 41 that results from differencing the two transmitted frequencies in time.

Figure 4:
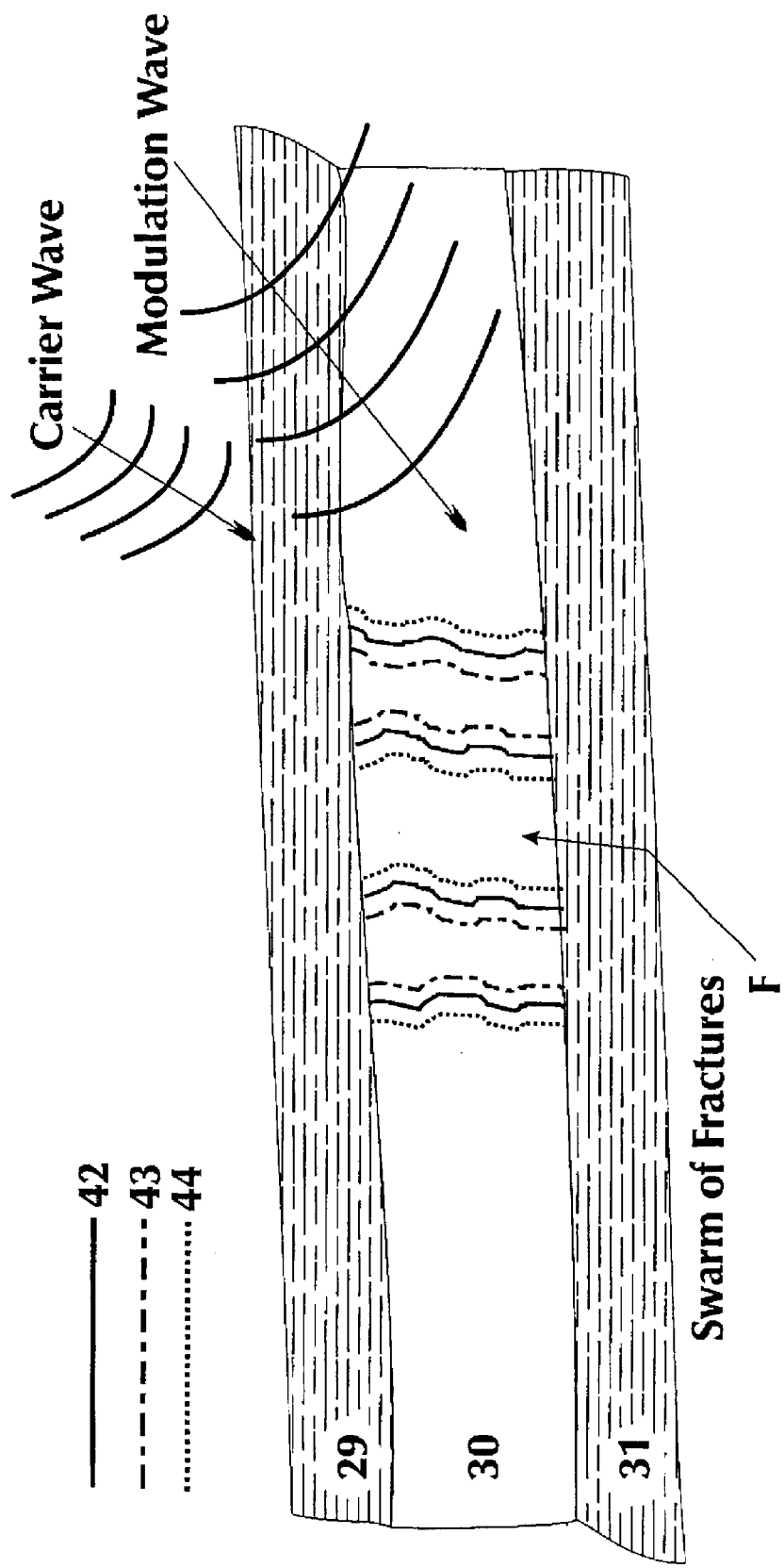
FIG. 4 illustrates the width modulation of open fractures with seismic signals.

FIG. 4 shows two open fractures F1 and F2 in the formation 30. The solid line 42 shows the fracture width when there is no compressional seismic signal intersecting them. When the 'modulation' wave 10 Hz mono-frequency signal arrives at the open fractures, it has higher amplitude due to lower attenuation at the lower seismic frequencies compared to the swept frequency signal, the 'carrier' wave of 15 to 100 Hz. The 10 Hz, 'modulation' wave signal modulates the fractures. The width of the fractures is squeezed to 43 during the compression cycle of the 'modulation' wave and opens to 44 during the rarefaction cycle of the 'modulation' wave. Because of this physical width, modulation of the open fractures mixing between the 'carrier' and the 'modulation' waves takes place. Sum and difference frequencies are generated. The new signals 40 and 41 as shown in FIG. 3 are formed. The cross-correlation of the recorded data with the new 'sweep' signals 40 and 41 images the swarm of the open fractures. While with the cross-correlation of the recorded data with 38, which is the standard 'sweep', provides the normal 2-D or 3-D seismic data, it can be processed like any other data that is being recorded and processed today.

Figure 5:
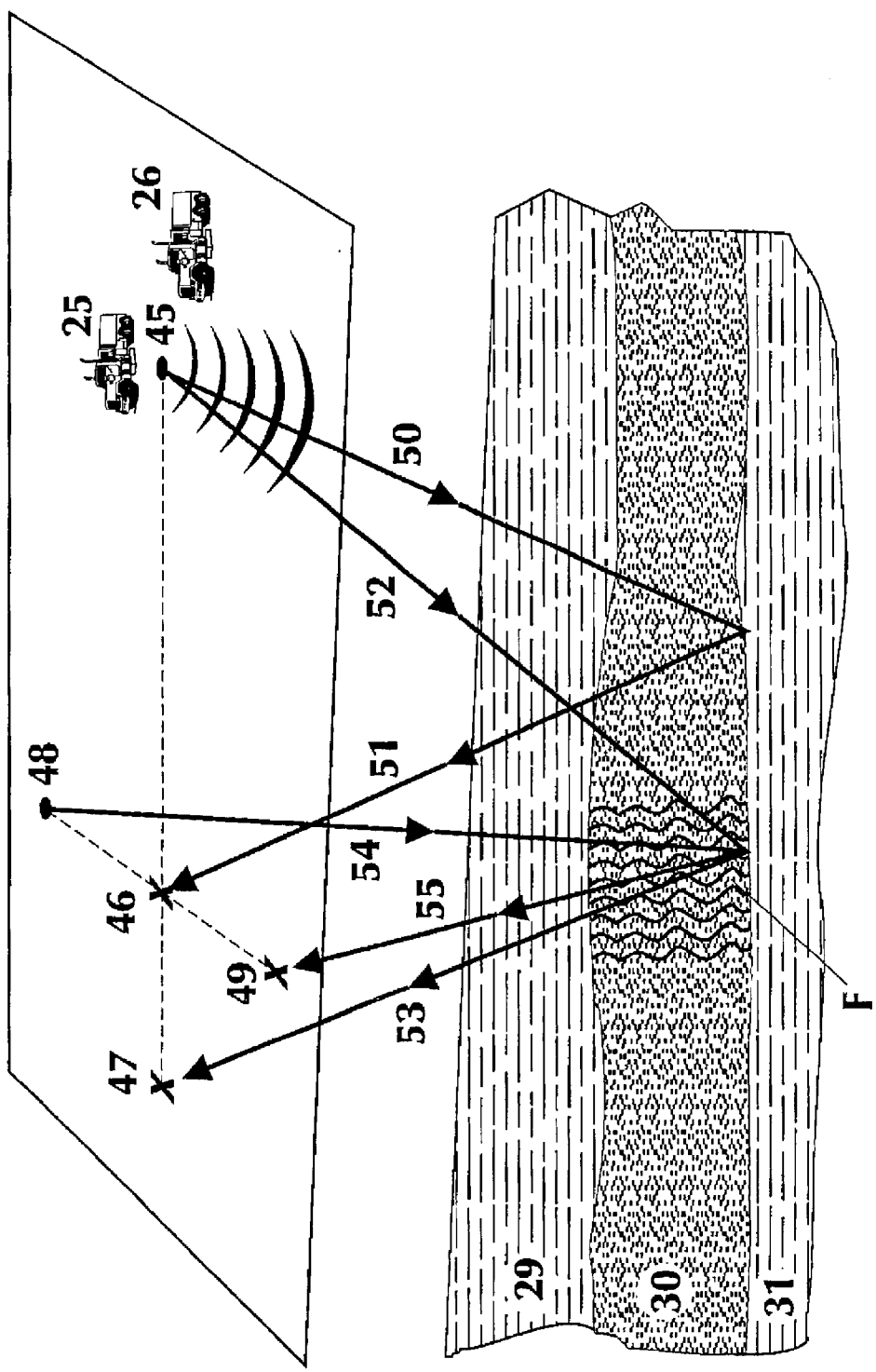
FIG. 5 illustrates that a 3-D volume of seismic data set that provides good offset distribution will be able to sample and image a swarm of fractures in a subsurface formation.

FIG. 5, which is partly in cross-section, displays two source locations 45 and 48, and three receiver locations 46, 47 and 49. These locations are part of a large 3-D seismic recording layout, which may have hundreds of receiver channels and a similar amount of source locations. The art of 3-D surface seismic is well understood in the industry; in FIG. 5 only a few source and receiver locations are shown to explain the concept of this invention. Any one familiar with the art, once they understand the concept of this invention, can easily implement this invention in the field. The seismic signals transmitted from sources 25 and 26, where 25 is transmitting a swept frequency signal and 26 a mono-frequency signal. Both sources are located at the same surface station 45. The travel path of the seismic signal transmitted from 45 is shown as 50. It is reflected at the lower interface of formation 30 and is shown as 51, and is recorded by receiver 46. The travel path of the transmitted and reflected signals that are shown as 50 and 51 do not intersect the swarm of fractures F. Since the signals 50 and 51 do not travel through the fractured rock, which is elastically nonlinear, there is no elastically nonlinear interaction between the two signals, and sum and difference frequencies are not generated. However, the signal paths of 52 and 53 intersect the fractures. The seismic signal received and recorded at 47 is the reflected signal from the lower interface of the formation 30, which has a swarm of fractures F, and part of the propagation of 52 and 53 is through that fractured rock. Due to fracturing discontinuities in the rock matrix, the rock properties become nonlinear and the seismic waves that travel through that fractured rock nonlinearly interact with each other. Due to this nonlinear interaction, sum and difference frequencies are generated. As shown in FIG. 3, the nonlinear interaction between 15 to 100 Hz sweep and 10 Hz mono-frequency signal generates a 25 to 110 Hz sweep, and a 5 to 90 Hz sweep, identified as 'modified-sweeps.'

The signal recorded at receiver location 46, when cross-correlated with the 'modified-sweeps', identified as 40 and 41 in FIG. 3, does not provide any coherent signal, with the result that no reflection can be mapped. However, the signal received and recorded at 47, when cross-correlated with the 'modified-sweeps' 40 and 41, has the time and phase coherency to map the reflection from the lower interface of the formation 30. So, this invention provides us a means of illuminating the reflection from the lower interface of the fractured formation. The reflection is there when the fractures are present, and the reflection is not there when there are no fractures.

When the sources are located or moved to source location 48, their transmitted signals are received and recorded at receiver location 49, the seismic signal 54 propagates through the fractures at an angle that is parallel to the fracture orientation, and is received and recorded at the receiver location 49. Since the seismic signal 54 travels parallel to the open fractures, it does not intersect them, with the result that there are no changes in the width of the fractures during the compression and rarefaction cycles of the 'modulation' wave, 10 Hz signal shown in FIG. 3 as 39. Since there is no width modulation of the open fractures of the swarm F, there is no nonlinear interaction between the two transmitted waves 38 and 39 transmitted by the surface sources.

Frequencies shown by 40 and 41 in FIG. 3 are not generated. The cross-correlation with the 'modified-sweeps' 40 and 41 does not provide any coherent reflected signals. The reflection from the lower interface of the formation 30 does not get mapped or illuminated.

This invention enables us to map subsurface open fractures by mapping the lower interface of a fractured reservoir formation at a certain source/receiver azimuthal angle that is at right angles to the fractures, while at ninety degrees to that particular angle, the source/receiver azimuthal angle will be parallel to the fractures and the reflection from that interface will not be there.

During processing, the total volume of the 3-D seismic data recorded will be correlated with the swept signal 38 in FIG. 3 for standard 3-D processing and displays. The same data will be correlated with 40 and 41, the 'modified-sweeps', and processed for mapping open fractures. This 3-D data volume can be sliced as 2-D lines according to the source/receiver azimuthal angles. To cover the full one hundred eighty degrees, six slices of 2-D data at thirty degrees apart would be adequate. Interpolation techniques can provide higher accuracy when needed. Each slice of 2-D data is processed for reflection imaging and the reflection quality of the fractured formation is analyzed. At a particular source/receiver azimuthal angle, which will be at right angles to the fracture orientation, the reflection from the fractured reservoir formation will have noticeable amplitude and stand out, and can be easily differentiated in a background of no other noticeable coherent signals. The common midpoints related to that strong reflection from the fractured formation provide the location of the open fractures. For the data recorded at right angles to that particular azimuthal angle which provides us the high amplitude reflection anomaly: there will be absence of coherent reflected energy, since the seismic signal will be traveling parallel to the fractures. The two results, the presence and absence of the reflected signal, will confirm the presence of fractures and identify their orientation. The contribution of this invention is that the final displays of the processed data that resulted from cross-correlation with the 'modified-sweeps' will highlight only the fractured reservoir formations and nothing else. The know-how and the necessary software to analyze and process this data exist in the industry, and this invention can be easily implemented by the industry with the existing software and equipment.

What is claimed is:

1. A method for mapping the open fractures in a subsurface formation using two compressional seismic waves (signals) transmitted from the surface into the subsurface formations and recording the reflected seismic signals from the subsurface formation boundaries by using multiple receivers located on the surface, the method comprising the steps of:

transmitting two sets of vibratory seismic signals, one of the seismic signals transmitted being a swept frequency signal and the other signal a fixed mono-frequency signal, both the signals transmitted from the same surface location and synchronized with each other to have the same start up time and the duration of transmission, the frequencies of both the vibratory seismic signals are pre-selected according to the required seismic resolution for mapping the fractures, both the seismic signals propagate in the earth and are reflected from the acoustic impedance contrasts of different subsurface formations, the reflected signals recorded by the multiple receivers located on the surface in pre-aligned geometric patterns to provide the desired source/receiver recording geometry, which provides Common Depth Point (CDP) coverage to map the fractures, the field recording geometry designed to cover the full range of offset and azimuth distribution needed to map the geologic target, recording the seismic reflected signals at the surface providing for each selected azimuth a complete range of source/receiver offset distances.

2. The method in claim 1 further comprising:

transmitting the swept frequency and mono-frequency signal using both surface seismic sources deployed at the same location and recording seismic reflection data using source/receiver lay out geometry to provide 3-D coverage, which comprises:
full CDP coverage, which provides the complete range of source/receiver offset distribution and azimuth distribution so that for every selected azimuth there is uniform and complete CDP coverage, the complete offset and azimuth 3-D coverage covers the area of interest where the open fractures in the subsurface formation are being mapped.

3. The method in claim 1 further comprising:

recording the reflection seismic data resulted from the swept frequency signal generated by the seismic vibratory source on the surface, and simultaneously recording the reflection seismic data, which resulted from the elastic nonlinear interaction of the swept frequency signal and the fixed mono-frequency signal as the two signals propagate through the open subsurface fractures;

thus creating a seismic data set, which has two sets of information superimposed, one set of information has the primary seismic reflection data resulted from the propagation of the vibratory sweep frequency signal generated on the surface, and the second set of information, which has subsurface reflection data resulted by the elastic nonlinear interaction between the two signals as they propagate through the open fractures;

separating the primary data set, which has the reflections generated by the swept frequency signal from the reflections generated by the nonlinear interaction of the simultaneous propagation of the swept frequency and mono-frequency signal, separation of the reflection signals achieved by cross-correlating the recorded data with the swept frequency signal, the process of cross-correlation being a powerful matching filter which measures the similarity between two data sets by multiplying the corresponding values sample by sample and summing the products, the final result of cross-correlation is the convolution of the autocorrelation pulse of the swept frequency signal with the reflectivity time series function of the subsurface.

4. The method in claim 1 further comprising:

generating the two additional swept frequency signals, representing the swept frequencies generated by the elastic nonlinear interaction between the swept frequency signal and the mono-frequency signal, which result due to addition and subtraction of the two signals;

cross-correlating the recorded data with the sweep frequency signal, which resulted with the frequency summation process, and cross-correlating the recorded data again with the sweep frequency signal resulted with the frequency subtraction process, in this manner creating two additional reflection data sets, which have new frequencies that were not transmitted from the surface but resulted due to nonlinear interaction between the surface generated seismic signals as they propagate through the subsurface open fractures, two data sets thus created, which represent the seismic reflection data where the effective seismic energy source is the nonlinear interaction as the two primary surface generated signals propagate through the open subsurface fractures;

there is no nonlinear interaction when the two primary signals do not intersect the fractures, either due to absence of fractures or due to propagation in the same plane as the fractures.

5. The method in claim 1 further comprising:

the said cross-correlated nonlinear seismic data, which results after cross-correlation with the two generated sweeps is processed and analyzed to detect the location and the orientation of the fractures, the processing flow and the parameters are kept the same as with the primary seismic reflection data, the nonlinear cross-correlated seismic reflection data analyzed and the analysis includes organizing the nonlinear seismic reflection data according to azimuthal angles, which can be gathered for example in 30 degree sectors, data in each sector stacked and migrated or pre-stack migrated to provide full 3-D seismic reflection volume images.

6. The method in claim 1 further comprising:

analyzing the nonlinear seismic reflection volume images created according to the source/receiver azimuthal angles, and identifying the most coherent image of the fractured subsurface formation, the most coherent nonlinear seismic image will result when the source/receiver azimuth is such that the propagation of the primary seismic signals is perpendicular to the open fractures, using this information to determine the orientation of the open fractures, the location of the fractures is defined by the spatial geometry of the reflection image of the said fractured formation;

confirm the results, which map the location and orientation of the fractures by analyzing the nonlinear seismic reflection volume images, in the case of the nonlinear seismic image created where the source/receiver azimuthal angles are parallel to the fractures, there should be no seismic reflection image of the said fractured formation, azimuthal dependence of the absence or presence of the nonlinear seismic image of the formation being surveyed for open fractures is diagnostic of the presence, the location and the orientation of the open fractures in subsurface formation.

* * * * *